United States Patent [19]

Mar

[11] 3,806,896

[45] Apr. 23, 1974

[54] REDUCED ACCESS TERMINAL MEMORY SYSTEM

[75] Inventor: Jerry Mar, Scotch Plains, N.J.

[73] Assignee: Bell Telephone Laboratories, Incorporated, Murray Hill, Berkeley Heights, N.J.

[22] Filed: Nov. 15, 1972

[21] Appl. No.: 306,701

[52] U.S. Cl....... 340/173 R, 340/166 R, 340/173 SP

[51] Int. Cl........................... G11c 5/06, G11c 17/00

[58] Field of Search........ 340/173 SP, 173 R, 166 R

[56] References Cited

UNITED STATES PATENTS 3,671,948 6/1972 Cassen........................... 340/173 SP 3,423,646 1/1969 Cubert et al. ................ 340/173 SP

*Primary Examiner*—Bernard Konick

*Assistant Examiner*—Stuart N. Hecker

*Attorney, Agent, or Firm*—I. Ostroff

[57] ABSTRACT

A Read Only Memory (ROM) system containing a reduced number of access terminals is achieved by sacrificing a limited number of memory locations by shorting the word line to the digit line at these locations. This allows the information stored in the remaining memory locations to be retrieved by applying appropriate potentials to the two word lines coupled to each memory cell and thereby eliminates the need for providing access terminals to the digit lines.

11 Claims, 2 Drawing Figures

REDUCED ACCESS TERMINAL MEMORY SYSTEM

BACKGROUND OF THE INVENTION

This invention relates to apparatus and methods for minimizing the number of access terminals of semiconductor memories.

A commonly used read-only memory (ROM) comprises an interconnected array of memory cells, each of which comprises a single diode. The array is arranged into word lines and digit lines which are orthogonal to each other. The anodes of diodes corresponding to a particular word line are coupled together and the cathodes of diodes corresponding to a particular digit line are coupled together. In order to access just one particular memory location in the array, it is necessary to raise the potential of the word line corresponding to the selected cell and to the lower potential of the digit line corresponding to the selected cell. If a diode does exist at the selected location, a flow of current is detected through the diode which is indicative of a stored "1." If no diode exists at the selected location, there is no conduction, which is indicative as a stored "0."

The simplicity of the memory cells of the above-described array is such that the cells may be fabricated in from one to two square mils of semiconductor area with a minimum number of fabrication steps. One undesirable feature of this type of memory is that a large number of external connections are required to access stored information. The physical geometry of the terminals and the necessary spacing cause the area of semiconductor material to be substantially greater than is needed to just accommodate the diode memory cells.

Typically, a memory array, like the diode memories, contains $n^2$ bits of stored information and consists of n word lines and n digit (bit) lines. One way to minimize the number of access lines is to put selection and detection peripheral circuits on the same integrated circuit chip as the memory cells. Unfortunately, the integrated circuit fabrication processing required for these peripheral circuits is usually far more complex than that of the memory array, thereby negating the advantage of simplicity of fabrication of the diode memory cells and escalating the cost.

It would be very desirable to have a semiconductor ROM array which requires substantially less semiconductor area and only approximately half the number of external access terminals of standard ROM arrays.

OBJECTS OF THE INVENTION

It is an object of this invention to provide a form of organization for memory arrays which allows for reduced semiconductor area and requires substantially fewer access terminals than the presently used memories.

SUMMARY OF THE INVENTION

This and other objects of the invention are attained in an illustrative embodiment thereof comprising an array of interconnected memory cells that are arranged in n rows and n columns, which are orthogonal. Cells in a common row are coupled together and an external terminal is coupled to each of the rows. Cells in a common column are coupled together but there are no external terminals connected to the columns. Each of the word lines is coupled to another word line through only one memory cell and digit line. Because of the coupling between word lines, one memory location per column of the array cannot be utilized for memory purposes. This means that instead of there being $n^2$ memory locations as in standard arrays, there are only $n(n-1)$ memory locations or bits. The number of external terminals is however reduced from $2n$ to $n$.

In order to access only one memory location of a diode array utilizing applicant's reduced access terminal memory system, it is necessary to first increase the potential of the word line corresponding to the selected cell by one half the amount necessary to forward bias a diode at the selected location and to lower the potential of the other word line which is directly coupled to the selected cell by one half the amount needed to forward bias the diode. If a diode does exist at the selected location a flow of current is detected. This flow of current indicates that a diode is at the location which is indicative of a stored "1" in that memory location. Since each memory cell of the array is connected between two word lines, any memory cell in the array can be interrogated by applying the proper potentials to the two word lines corresponding to a selected memory cell. It is necessary to have only $n$ terminals for $n(n-1)$ bits of stored information as compared to the $2n$ terminals necessary for the $n^2$ bits of standard diode arrays.

This and other objects, features and embodiments of the invention will be better understood from a consideration of the following detailed description taken in conjunction with the following drawings:

DETAILED DESCRIPTION

Figure 1:
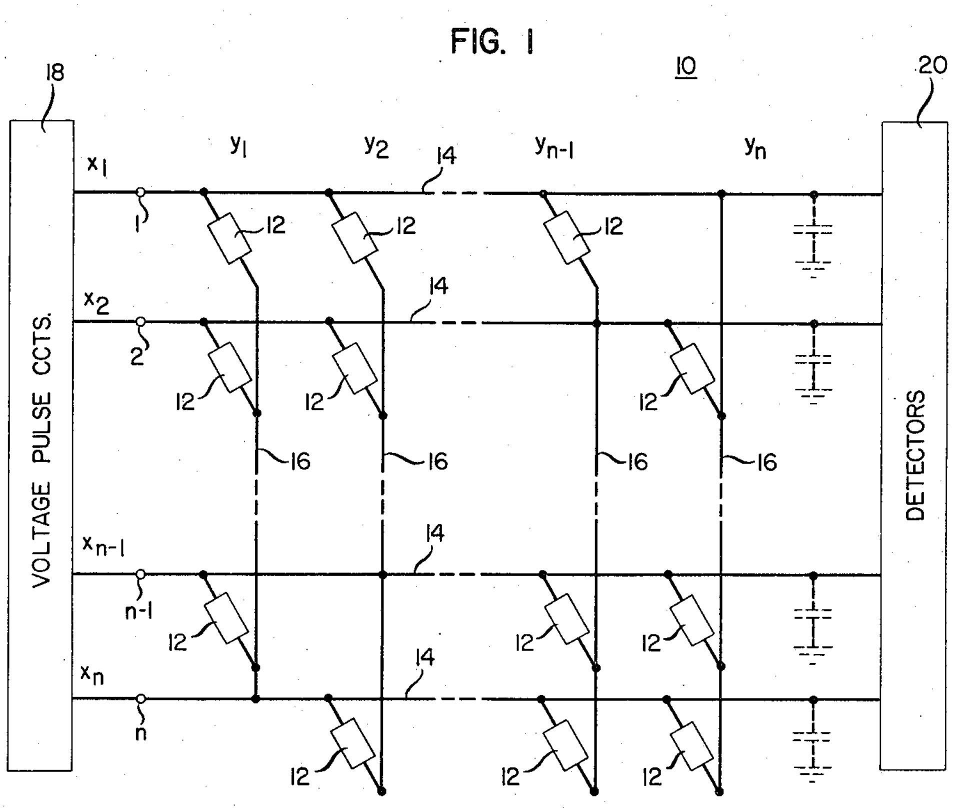
FIG. 1 illustrates one embodiment of the invention.

Referring to FIG. 1 there is illustrated a memory array system 10 comprising memory cells 12 organized into $x_n$ rows and $y_n$ columns. Access terminals 1, 2,. . .$n$ are coupled to word lines 14, which are coupled to each of the memory cells 12 of a common row. Digit lines 16 couple each of the memory cells 12 of a common column. Every $y$ column and every $x$ row each contains only $n-1$ memory cells. For example, the memory locations $(x_1, y_n)$, $(y_2, x_{n-1})$, and $(y_{n-1}, x_2)$ do not contain memory cells. At each of these locations the digit line 16 is coupled to the corresponding word line 14. This results in a square matrix array having $n(n-1)$ memory locations and $n$ locations at which a row and column are coupled together. These $n$ locations cannot be used as memory locations. The intersection of a row and a column is generally denoted as a crosspoint.

Figure 2:
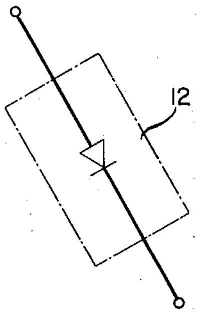
FIG. 2 illustrates a circuit embodiment which can be utilized as the memory cell of FIG. 1.

The single diode memory cell 12 of FIG. 2 may be used as a memory cell of FIG. 1 in order to obtain a read-only memory system. In a read-only memory system a diode at a particular location represents a stored "1" while the absence of a diode represents a stored "0." This memory can be easily operated in a bit organized fashion. If at location $(x_1, y_1)$ of the memory array of FIG. 1, there is in fact, a diode as is shown in FIG. 1 its presence can be easily detected as follows: voltage pulse circuits 18 provide a positive potential of one half the value necessary to forward bias the diode to word line 14 which is coupled to terminal 1 and provide a negative polarity voltage pulse of one half the necessary to forward bias the diode coupled to word line 14 which is coupled to terminal $n$. This combination of voltage pulses forward biases the diode at location $(x_1, y_1)$ and causes conduction through it. Detectors 20 coupled to the word line 14 coupled to terminal n detect the resulting conduction which is interpreted as a "1" corresponding to the memory location $(x_1, y_1)$.

In order to retrieve the information stored in the memory array at location $(x_{n-1}, y_{n-1})$, it is necessary to apply the proper potentials to terminals $n$—1 and 2. If a diode does exist at the selected memory location, conduction will be detected by a detector coupled to the word line 14 coupled to terminal 2 when the proper voltage pulses are applied to the two-word lines 14.

The diode memory array can be operated in a word organized fashion as follows: in order to read out all of the bits of the word line 14 connected to terminal 1, a positive polarity voltage pulse of sufficient value to forward bias all of the diodes coupled to terminal 1, is applied to terminal 1. The resulting conduction through the diode located at memory location $(x_1, y_1)$ flows into terminal $n$; conduction through the diode located at memory location $(x_1, y_2)$ flows into terminal $n$—1; conduction through the diode located at memory location $(x_1, y_{n-1})$ flows into terminal 2. There is no memory cell at memory location $(x_1, y_n)$ since the word line 14 coupled to terminal n is connected to the digit line 16 at that location. Current or the lack of it flowing into terminals $x_2$, $x_{n-1}$) and $x_n$ is detected by the detectors 20 coupled to the word lines 14 or it can be stored in capacitors (shown as dashed lines), which may be coupled to the word lines 14. The potential of the capacitors is then indicative of the information stored at a particular memory location.

The semiconductor area of standard relatively large capacity read-only memories, which are made up of diodes and contain no decoding circuitry, is generally limited by the number and spacing of the beam leads or bonding pads. Typically, the center-to-center spacing of the bonding pads or beam leads is 3 mils or more. For a read-only memory consisting of 8,192 bits 256 external terminals are needed. If these 256 terminals are equally spaced around the four sides of the integrated chip, there are 64 terminals on a side. Assuming 3 mil center-to-center spacing between the 64 terminals results in an integrated circuit chip of 192 mils on a side having an area of 36,864 square mils. This means that approximately 4.35 square mils of semiconductor area is required for every bit (36,864/8,192). If one considers that the semiconductor area required for an individual diode of the array is typically only 1 square mil and that, therefore, only approximately 8,192 square mils of semiconductor area are necessary for the array itself, it is apparent that the number of terminals and the required spacing significantly increase the semiconductor area needed and, consequently, the cost.

Using the memory organization illustrated in FIG. 1 it is possible to fabricate a ROM consisting of diodes with a capacity of 8,064 bits which requires only 128 terminals (32 terminals per each side of the integrated circuit chip). Assuming 3 mil center-to-center spacing between the adjacent 32 terminals results in an integrated circuit chip of 96 mils on a side having an area of 9,216 square mils. This results in 1.14 square mils of semiconductor area per bit (9,216/8,064), which is approximately four times better than the standard ROM.

It is to be understood that the embodiments described are merely illustrative of the general principles of the invention. Various modifications are possible within the spirit of the invention. For example, memory cells containing more than two terminals may be utilized with an appropriate reduction in the number of access lines usually necessary.

What is claimed is:

1. A memory array comprising:

a plurality of rows and columns of memory cells each of the memory cells of a common row being coupled together and each of the memory cells of a common column being coupled together;

a plurality of terminals of which a separate terminal is coupled to each of the common rows of memory cells; and each of the columns being directly electrically connected to a separate one of the rows.

2. The apparatus of claim 1 wherein each memory cell comprises a diode.

3. The apparatus of claim 1 further comprising voltage pulse circuits and detection circuits coupled to the rows.

4. The apparatus of claim 1 further comprising a capacitor coupled to each of the rows.

5. A semiconductor memory array system comprising:

a plurality of $n$ rows and $n$ columns of memory cells, each of the memory cells comprising a diode;

the rows and columns being orthogonal to each other;

each of the memory cells of a common row being coupled together and each of the memory cells of a common column being coupled together;

a plurality of $n$ terminals, one terminal of each of the $n$ terminals being coupled to each of the common $n$ rows of memory cells; and each of the columns being directly electrically connected to a separate one of the rows, the intersection of all rows and columns, except at those intersections at which a column is electrically connected to a row, determining memory storage locations.

6. The apparatus of claim 5 further comprising voltage pulse circuits and detection circuits coupled to each of the $n$ rows.

7. The apparatus of claim 5 further comprising a separate capacitor coupled to each of the $n$ rows.

8. A memory array system comprising:

a plurality of $n$ conductive rows and $n$ conductive columns forming a matrix of insulated conductors;

a separate terminal being coupled to each one of the common rows of conductors; and each of the columns being electrically coupled to a separate one of the rows, the intersection of all rows and columns, except where a column is electrically connected to a row determining memory storage locations.

9. A memory array comprising:

means forming a plurality of conductive rows;

means forming a like plurality of conductive columns, the columns and rows forming a square matrix of crosspoints;

means for electrically connecting essentially directly each conductive row separately to a different one of the conductive columns whereby there is formed essentially direct electrical connections at a like plurality of crosspoints; and means for defining a memory state interconnecting a row and a column at selected ones of the remaining crosspoints.

10. A combination including the memory array of claim 9 and means for addressing individual crosspoints for ascertaining its memory state.

11. The combination of claim 10 wherein the plurality of means defining a memory state are diodes.

* * * * *